(12) United States Patent
Sodal

(10) Patent No.: US 8,913,463 B2
(45) Date of Patent: Dec. 16, 2014

(54) POSITIONING SYSTEM

(75) Inventor: Audun Sodal, Ranheim (NO)

(73) Assignee: Electromagnetic Geoservices ASA, Trondheim (NO)

(*) Notice: Subject to any disclaimer, the term of this patent is extended or adjusted under 35 U.S.C. 154(b) by 1351 days.

(21) Appl. No.: 12/445,419

(22) PCT Filed: Oct. 11, 2007

(86) PCT No.: PCT/GB2007/003880
§ 371 (c)(1),
(2), (4) Date: Nov. 12, 2009

(87) PCT Pub. No.: WO2008/044042
PCT Pub. Date: Apr. 17, 2008

(65) Prior Publication Data
US 2010/0061187 A1 Mar. 11, 2010

(30) Foreign Application Priority Data

Oct. 12, 2006 (GB) .................................. 0620328.5

(51) Int. Cl.
| H04B 11/00 | (2006.01) |
| G01S 13/86 | (2006.01) |
| G01S 5/22 | (2006.01) |
| G01V 1/00 | (2006.01) |

(52) U.S. Cl.
CPC . *G01S 13/86* (2013.01); *G01S 5/22* (2013.01); *G01V 1/001* (2013.01)
USPC .............. 367/131; 367/15; 324/347; 324/348

(58) Field of Classification Search
CPC .............. G01S 5/22; G01S 13/86; G01V 1/00
USPC ........... 324/345, 350, 365; 367/15, 127, 154, 367/131
See application file for complete search history.

(56) References Cited

U.S. PATENT DOCUMENTS

| 1,818,331 A | 8/1931 | Jakosky |
| 2,077,707 A | 4/1937 | Melton |
| 2,139,460 A | 12/1938 | Potapenko |
| 2,268,106 A | 12/1941 | Blau |

(Continued)

FOREIGN PATENT DOCUMENTS

| EP | 0087271 | 8/1983 |
| EP | 0215695 | 3/1987 |

(Continued)

OTHER PUBLICATIONS

"Applications of 3-Dimensional Electromagnetic Induction by Sources in the Ocean", A proposal submitted to MAST III under Area C: Marine Technology, Part 1.

(Continued)

*Primary Examiner* — Daniel L Murphy
(74) *Attorney, Agent, or Firm* — Patterson Thuente Pedersen, P.A.

(57) ABSTRACT

A passive listening acoustic system and method of use may include source means for providing continuous, pulsed, or pulse coded acoustic signals at two or more frequencies and at least two acoustic sensors or hydrophones which detect and record a signal for use within a Seabed Logging system to determine the position and/or orientation of instruments in the system.

9 Claims, 4 Drawing Sheets

(56) References Cited

U.S. PATENT DOCUMENTS

| | | |
|---|---|---|
| 2,426,918 A | 9/1947 | Barret |
| 2,531,088 A | 11/1950 | Thompson |
| 2,766,422 A | 10/1956 | Carbonetto |
| 2,907,389 A | 10/1959 | Hitzman |
| 2,919,397 A | 12/1959 | Morley |
| 2,953,742 A | 9/1960 | Herbold |
| 3,052,836 A | 9/1962 | Postma |
| 3,105,014 A | 9/1963 | Harrison |
| 3,113,316 A | 12/1963 | Berry |
| 3,114,875 A | 12/1963 | Haagensen |
| 3,182,250 A | 5/1965 | Mayes |
| 3,332,487 A | 7/1967 | Jones |
| 3,398,356 A | 8/1968 | Still |
| 3,548,299 A | 12/1970 | Duroux et al. |
| 3,763,419 A | 10/1973 | Barringer |
| 3,806,795 A | 4/1974 | Morey |
| 3,819,246 A | 6/1974 | List |
| 3,836,960 A | 9/1974 | Gehman et al. |
| 3,959,721 A | 5/1976 | Roschuk et al. |
| 3,990,123 A | 11/1976 | Stachiw et al. |
| 4,010,413 A | 3/1977 | Daniel |
| 4,041,372 A | 8/1977 | Miller et al. |
| 4,047,098 A | 9/1977 | Duroux |
| 4,077,686 A | 3/1978 | Bukaitz |
| 4,079,309 A | 3/1978 | Seeley |
| 4,094,304 A | 6/1978 | Wright, Jr. |
| 4,168,484 A | 9/1979 | Wright, Jr. |
| 4,218,678 A | 8/1980 | Fowler et al. |
| 4,229,809 A | 10/1980 | Schwalbe |
| 4,245,191 A | 1/1981 | Schroeder |
| 4,258,321 A | 3/1981 | Neale, Jr. |
| 4,258,322 A | 3/1981 | Rocroi et al. |
| 4,283,099 A | 8/1981 | Burton |
| 4,296,379 A | 10/1981 | Yoshizumi |
| 4,298,840 A | 11/1981 | Bischoff et al. |
| 4,308,499 A | 12/1981 | Thierbach et al. |
| 4,396,885 A | 8/1983 | Constant |
| 4,417,210 A | 11/1983 | Rocroi et al. |
| 4,446,434 A | 5/1984 | Sternberg et al. |
| 4,451,789 A | 5/1984 | Meador |
| 4,456,067 A | 6/1984 | Pinner |
| 4,489,276 A | 12/1984 | Yu |
| 4,492,924 A | 1/1985 | Nilsson |
| 4,494,805 A | 1/1985 | Washburn |
| 4,500,146 A | 2/1985 | Peterson |
| 4,506,225 A | 3/1985 | Loveless et al. |
| 4,516,226 A | 5/1985 | Peynaud et al. |
| 4,547,733 A | 10/1985 | Thoraval |
| 4,583,095 A | 4/1986 | Peterson |
| 4,594,551 A | 6/1986 | Cox et al. |
| 4,616,184 A | 10/1986 | Lee et al. |
| 4,617,518 A | 10/1986 | Srnka |
| 4,633,182 A | 12/1986 | Dzwinel |
| 4,652,829 A | 3/1987 | Safinya |
| 4,660,645 A | 4/1987 | Newlove |
| 4,677,438 A | 6/1987 | Michiguchi et al. |
| 4,698,791 A | 10/1987 | Cunningham |
| 4,760,340 A | 7/1988 | Denzau et al. |
| 4,791,998 A | 12/1988 | Hempkins et al. |
| 4,793,664 A | 12/1988 | Jackson |
| 4,835,473 A | 5/1989 | Bostick, Jr. |
| 4,835,474 A | 5/1989 | Parra et al. |
| 4,906,575 A | 3/1990 | Silver et al. |
| 4,926,394 A | 5/1990 | Doyen |
| 4,957,172 A | 9/1990 | Patton et al. |
| 4,986,354 A | 1/1991 | Cantu |
| 4,992,995 A | 2/1991 | Favret |
| 5,025,218 A | 6/1991 | Ramstedt |
| 5,032,794 A | 7/1991 | Ridd et al. |
| 5,039,179 A | 8/1991 | Chouzenoux |
| 5,043,667 A | 8/1991 | Schofield |
| 5,066,916 A | 11/1991 | Rau |
| 5,103,920 A | 4/1992 | Patton et al. |
| 5,170,440 A | 12/1992 | Cox |
| 5,172,480 A | 12/1992 | Labuc et al. |
| 5,177,445 A | 1/1993 | Cross |
| 5,185,578 A | 2/1993 | Stolarczykz |
| 5,192,952 A | 3/1993 | Johler |
| 5,219,386 A | 6/1993 | Kletzmaier et al. |
| 5,280,284 A | 1/1994 | Johler |
| 5,357,253 A | 10/1994 | Van Etten et al. |
| 5,369,892 A | 12/1994 | Dhaemers |
| 5,373,443 A | 12/1994 | Lee et al. |
| 5,400,030 A | 3/1995 | Duren et al. |
| D359,403 S | 6/1995 | Tisbo et al. |
| 5,421,646 A | 6/1995 | McNamara et al. |
| D361,446 S | 8/1995 | Acard |
| 5,444,619 A | 8/1995 | Hoskins et al. |
| H1490 H | 9/1995 | Thompson et al. |
| D362,767 S | 10/1995 | Kelly et al. |
| D366,376 S | 1/1996 | Tisbo et al. |
| D366,577 S | 1/1996 | Tisbo et al. |
| 5,486,764 A | 1/1996 | Thompson et al. |
| H1524 H | 4/1996 | Thompson et al. |
| H1561 H | 7/1996 | Thompson |
| 5,563,513 A | 10/1996 | Tasci |
| 5,564,806 A | 10/1996 | Keisling et al. |
| 5,581,024 A | 12/1996 | Meyer, Jr. et al. |
| 5,689,068 A | 11/1997 | Locatelli et al. |
| 5,690,401 A | 11/1997 | Franklin |
| 5,704,142 A | 1/1998 | Stump |
| 5,724,309 A | 3/1998 | Higgs et al. |
| 5,767,679 A | 6/1998 | Schroder |
| 5,770,945 A | 6/1998 | Constable |
| 5,777,478 A | 7/1998 | Jackson |
| 5,798,892 A | 8/1998 | Kobayashi et al. |
| 5,811,973 A | 9/1998 | Meyer, Jr. |
| 5,825,188 A | 10/1998 | Montgomery et al. |
| 5,838,634 A | 11/1998 | Jones |
| 5,841,280 A | 11/1998 | Yu et al. |
| 5,877,995 A | 3/1999 | Thompson et al. |
| 5,886,526 A | 3/1999 | Wu |
| 5,892,361 A | 4/1999 | Meyer, Jr. et al. |
| 5,894,450 A | 4/1999 | Schmidt et al. |
| 5,901,795 A | 5/1999 | Tsao et al. |
| 5,905,380 A | 5/1999 | Weiner et al. |
| 5,905,657 A | 5/1999 | Celniker |
| 5,940,777 A | 8/1999 | Keskes |
| 5,955,884 A | 9/1999 | Payton et al. |
| 5,987,388 A | 11/1999 | Crawford et al. |
| 5,996,414 A | 12/1999 | Mercado |
| 6,002,357 A | 12/1999 | Redfern et al. |
| 6,005,916 A | 12/1999 | Johnson et al. |
| 6,011,557 A | 1/2000 | Keskes et al. |
| 6,023,168 A | 2/2000 | Minerbo |
| 6,026,913 A | 2/2000 | Mandal et al. |
| 6,041,018 A | 3/2000 | Roche |
| 6,049,760 A | 4/2000 | Scott |
| 6,060,884 A | 5/2000 | Meyer, Jr. et al. |
| 6,060,885 A | 5/2000 | Tabarovsky et al. |
| 6,061,412 A | 5/2000 | Stucker et al. |
| 6,087,833 A | 7/2000 | Jackson |
| 6,101,448 A | 8/2000 | Ikelle et al. |
| 6,108,605 A | 8/2000 | Doyle et al. |
| 6,114,972 A | 9/2000 | Smith |
| 6,140,819 A | 10/2000 | Peterman et al. |
| 6,157,195 A | 12/2000 | Vail, III |
| 6,163,155 A | 12/2000 | Bittar |
| 6,181,138 B1 | 1/2001 | Hagiwara et al. |
| 6,184,685 B1 | 2/2001 | Paulk et al. |
| 6,188,221 B1 | 2/2001 | Van de Kop et al. |
| 6,188,222 B1 | 2/2001 | Seydoux et al. |
| 6,225,806 B1 | 5/2001 | Millar et al. |
| 6,236,211 B1 | 5/2001 | Wynn |
| 6,236,212 B1 | 5/2001 | Wynn |
| 6,246,240 B1 | 6/2001 | Vail, III |
| 6,294,917 B1 | 9/2001 | Nichols |
| 6,339,333 B1 | 1/2002 | Kuo |
| 6,389,360 B1 | 5/2002 | Alft et al. |
| 6,415,231 B1 | 7/2002 | Hebert |
| 6,424,918 B1 | 7/2002 | Jorgensen et al. |
| 6,450,599 B1 | 9/2002 | Mamuyac |
| 6,480,000 B1 | 11/2002 | Kong et al. |
| 6,499,817 B2 | 12/2002 | Jermain |

(56) References Cited

U.S. PATENT DOCUMENTS

| | | | |
|---|---|---|---|
| 6,525,540 B1 | 2/2003 | Kong et al. | |
| 6,532,192 B1 * | 3/2003 | Reid | 367/127 |
| 6,573,855 B1 | 6/2003 | Hayakawa et al. | |
| 6,628,119 B1 | 9/2003 | Eidesmo et al. | |
| 6,662,147 B1 | 12/2003 | Fournier et al. | |
| 6,696,839 B2 | 2/2004 | Ellingsrud et al. | |
| 6,700,526 B2 | 3/2004 | Witten | |
| 6,717,411 B2 | 4/2004 | Ellingsrud et al. | |
| 6,777,940 B2 | 8/2004 | Macune | |
| 6,826,483 B1 | 11/2004 | Anderson et al. | |
| 6,834,732 B2 | 12/2004 | Haarstad | |
| 6,842,006 B2 | 1/2005 | Conti et al. | |
| 6,859,038 B2 | 2/2005 | Ellingsrud et al. | |
| 6,864,684 B2 | 3/2005 | Ellingsrud et al. | |
| 6,900,639 B2 | 5/2005 | Ellingsrud et al. | |
| 6,917,564 B2 | 7/2005 | Leaney | |
| 6,950,786 B1 | 9/2005 | Sonneland et al. | |
| 6,950,790 B1 | 9/2005 | Nichols | |
| 7,026,819 B2 | 4/2006 | Eidesmo et al. | |
| 7,028,806 B2 | 4/2006 | Dubinsky et al. | |
| 7,032,707 B2 | 4/2006 | Egerev et al. | |
| 7,038,456 B2 | 5/2006 | Ellingsrud et al. | |
| 7,038,850 B2 | 5/2006 | Chang et al. | |
| 7,042,802 B2 | 5/2006 | Sinha | |
| 7,072,767 B2 | 7/2006 | Routh et al. | |
| 7,095,357 B1 | 8/2006 | Johler | |
| 7,106,065 B1 | 9/2006 | Graf | |
| 7,123,543 B2 | 10/2006 | Vaage et al. | |
| 7,126,338 B2 | 10/2006 | MacGregor et al. | |
| 7,145,341 B2 | 12/2006 | Ellingsrud et al. | |
| 7,149,672 B2 | 12/2006 | Torkildsen | |
| 7,202,669 B2 | 4/2007 | Ellingsrud et al. | |
| 7,319,330 B2 | 1/2008 | Amundsen | |
| 7,423,432 B2 | 9/2008 | Amundsen | |
| 7,471,089 B2 | 12/2008 | Zerilli et al. | |
| 7,613,570 B2 | 11/2009 | Rosten et al. | |
| 7,664,603 B2 | 2/2010 | Rosten et al. | |
| 7,919,965 B2 | 4/2011 | Schaug-Pettersen et al. | |
| 8,008,920 B2 | 8/2011 | Lu et al. | |
| 8,086,426 B2 | 12/2011 | El Ouair et al. | |
| 8,188,748 B2 | 5/2012 | Schaug-Pettersen | |
| 2003/0048105 A1 | 3/2003 | Ellingsrud et al. | |
| 2003/0050759 A1 | 3/2003 | Srnka et al. | |
| 2003/0052685 A1 | 3/2003 | Ellingsrud et al. | |
| 2004/0000912 A1 | 1/2004 | Conti et al. | |
| 2004/0003511 A1 | 1/2004 | Silver | |
| 2004/0017137 A1 | 1/2004 | Straub | |
| 2004/0027130 A1 | 2/2004 | Ellingsrud et al. | |
| 2004/0046568 A1 | 3/2004 | Unsworth et al. | |
| 2004/0090234 A1 | 5/2004 | Macune | |
| 2004/0176910 A1 | 9/2004 | Ellingsrud et al. | |
| 2005/0035696 A1 | 2/2005 | Parise et al. | |
| 2005/0040742 A1 | 2/2005 | Tsai | |
| 2005/0052949 A1 | 3/2005 | Gaston et al. | |
| 2005/0264294 A1 | 12/2005 | Constable | |
| 2006/0005965 A1 | 1/2006 | Chouzenoux et al. | |
| 2006/0038570 A1 | 2/2006 | Constable | |
| 2006/0091889 A1 | 5/2006 | Ellingsrud et al. | |
| 2006/0103387 A1 | 5/2006 | Amundsen | |
| 2006/0202697 A1 | 9/2006 | Sodal | |
| 2007/0145980 A1 | 6/2007 | Conti et al. | |
| 2007/0150201 A1 | 6/2007 | Eidesmo et al. | |
| 2007/0294036 A1 | 12/2007 | Strack et al. | |
| 2008/0065330 A1 | 3/2008 | Rosten et al. | |
| 2008/0122444 A1 | 5/2008 | Schaug-Pettersen et al. | |
| 2008/0169817 A1 | 7/2008 | Morrison et al. | |
| 2008/0189043 A1 | 8/2008 | Anno et al. | |
| 2008/0195358 A1 | 8/2008 | El Ouair et al. | |
| 2008/0221795 A1 | 9/2008 | Amundsen et al. | |
| 2009/0134877 A1 | 5/2009 | Schaug-Pettersen | |
| 2009/0195251 A1 | 8/2009 | Darnet et al. | |
| 2009/0243617 A1 | 10/2009 | Farrelly et al. | |
| 2009/0265111 A1 | 10/2009 | Helwig et al. | |
| 2009/0267608 A1 | 10/2009 | Johnstad et al. | |
| 2009/0271118 A1 | 10/2009 | Saltzer et al. | |
| 2010/0045295 A1 | 2/2010 | Mittet et al. | |
| 2010/0052688 A1 | 3/2010 | Schaug-Pettersen | |
| 2010/0057363 A1 | 3/2010 | Amundsen | |
| 2010/0061187 A1 | 3/2010 | Sodal | |

FOREIGN PATENT DOCUMENTS

| | | |
|---|---|---|
| EP | 0219234 | 4/1987 |
| EP | 0368762 | 5/1990 |
| EP | 0512756 | 11/1991 |
| EP | 0481886 | 4/1992 |
| EP | 0568612 | 3/1996 |
| EP | 0814349 | 12/1997 |
| EP | 1094338 | 4/2001 |
| EP | 1253437 | 10/2002 |
| EP | 1253443 | 10/2002 |
| EP | 1255126 | 11/2002 |
| EP | 1309887 | 3/2004 |
| EP | 1256019 | 6/2004 |
| FR | 2479992 | 10/1981 |
| FR | 2586302 | 2/1987 |
| GB | 188676 | 12/1922 |
| GB | 1342475 | 1/1974 |
| GB | 1588495 | 4/1981 |
| GB | 2 089 043 A | 6/1982 |
| GB | 2155182 | 9/1985 |
| GB | 2197078 | 5/1988 |
| GB | 2 197 952 A | 6/1988 |
| GB | 220070 | 12/1989 |
| GB | 2220071 | 12/1989 |
| GB | 2231602 | 11/1990 |
| GB | 2256715 | 12/1992 |
| GB | 2296567 | 7/1996 |
| GB | 2301902 | 12/1996 |
| GB | 2323443 | 9/1998 |
| GB | 2333364 | 7/1999 |
| GB | 2355538 | 4/2001 |
| GB | 2382875 | 7/2001 |
| GB | 2364390 | 1/2002 |
| GB | 2384068 | 7/2003 |
| GB | 2385923 | 9/2003 |
| GB | 2 390 904 A | 1/2004 |
| GB | 2391946 | 2/2004 |
| GB | 2395563 | 5/2004 |
| GB | 2399640 | 9/2004 |
| GB | 2 404 444 A | 2/2005 |
| GB | 2411006 | 8/2005 |
| GB | 2413187 | 10/2005 |
| GB | 2413188 | 10/2005 |
| GB | 2415511 | 12/2005 |
| GB | 2421800 | 7/2006 |
| GB | 2425182 | 10/2006 |
| JP | 2002-244580 | 8/2002 |
| JP | 2006-145360 | 6/2006 |
| WO | WO 81/01617 | 6/1981 |
| WO | WO 89/10463 | 11/1989 |
| WO | WO 90/00749 | 1/1990 |
| WO | WO 92/13172 | 8/1992 |
| WO | WO 92/15771 | 9/1992 |
| WO | WO 92/15900 | 9/1992 |
| WO | WO 94/20864 | 9/1994 |
| WO | WO96/06367 | 2/1996 |
| WO | WO 96/33426 | 10/1996 |
| WO | WO 96/35859 | 11/1996 |
| WO | WO 97/33184 | 9/1997 |
| WO | WO 98/11455 | 3/1998 |
| WO | WO98/28638 | 7/1998 |
| WO | WO99/13966 | 3/1999 |
| WO | WO 00/00850 | 1/2000 |
| WO | WO 00/13046 | 3/2000 |
| WO | WO 00/54075 | 9/2000 |
| WO | WO00/63718 | 10/2000 |
| WO | WO 01/20366 | 3/2001 |
| WO | WO 01/33481 | 5/2001 |
| WO | WO 01/42818 | 6/2001 |
| WO | WO 01/55749 | 8/2001 |
| WO | WO 01/57555 | 8/2001 |
| WO | WO 02/14906 | 2/2002 |
| WO | WO 03/034096 | 4/2003 |

(56) References Cited

FOREIGN PATENT DOCUMENTS

| WO | WO 03/036331 | 5/2003 |
|----|--------------|--------|
| WO | WO 03/042718 | 5/2003 |
| WO | WO 03/048737 | 6/2003 |
| WO | WO 03/048812 | 6/2003 |
| WO | WO 03/004844 | 12/2003 |
| WO | WO 03/100467 | 12/2003 |
| WO | WO 03/104844 A1 | 12/2003 |
| WO | WO 2004/053528 | 6/2004 |
| WO | WO2004/083898 | 9/2004 |
| WO | WO 2007/018810 | 2/2007 |

OTHER PUBLICATIONS

"Applications of 3-Dimensional Electromagnetic Induction by Sources in the Ocean", A proposal submitted to MAST III under Area C: Marine Technology, Part 2.

Barton et al., "LITHOS", Cambridge Advanced Lithological Imaging Project Phase 1: 1998-2001 Sub-basalt Imaging, Aug. 21, 1997.

Brevik, "Rock model based inversion of saturation and pressure changes from time lapse seismic data," SEG 1999 Expanded Abstracts (4 pgs.).

Chave et al., "Controlled Electromagnetic Sources for Measuring Electrical Conductivity Beneath the Oceans 1", Forward Problem and Model Study, J. Geophysical Research, vol. 87, No. B7, pp. 5327-5338, Jul. 10, 1982.

Chave et al., "*Some Comments on Seabed Propagation of ULF/ELF Electromagnetic Fields*", 25 Radio Science 825-36 (Sep. 1990).

Constable et al., "Marine controlled-source electomagnetic sounding 2. The Pegasus experiment" Journal of Geophysical Research. 101. B3 (1996): 5519-5530.

Constable et al., Marine Magnetotellurics for petroleum exploration, Part 1: A sea-floor equipment system. Geophysics 63(3) 816-825. (May-Jun. 1998).

Das.,"Apparent resistivity curves in controlled-source electromagnetic sounding directly reflecting true resistivities in a layered earth" vol. 60, No. 1, pp. 53-60 (Jan.-Feb. 1995).

Edwards et al., "Electromagnetic Assessment of Offshore Methane Hydrate Deposits in the Cascadia Margin", MARELEC 99, 1999.

Edwards et al., "The Assessment of Marine Gas Hydrates through Electrical Remote Sounding: Hydrate without a BSR", Geophysical Research Letters, vol. 27, No. 16, pp. 2397-2400, Aug. 15, 2000.

Edwards, "*On the Resource evaluation of Marine Gas Hydrate Deposits Using Sea-Floor Transient Electric Dipole-Dipole Methods*", 62 Geophysics 63-74 (Jan. 1997).

Eidesmo et al., "Remote detection of hydrocarbon filled layers using marine controlled source electromagnetic sounding," EAGE 64$^{th}$ Conference & Exhibition—Florence, Italy, 4 pages, May 27-30, 2002.

Eidesmo et al., "*Sea Bed Logging (SBL), a new method for remote and direct identification of hydrocarbon filled layers in deepwater areas*", 20 First Break (Mar. 2002).

Ellingsrud et al., "*How Electromagnetic Sounding Technique Could be Coming to Hydrocarbon E & P*", 20 First Break (Mar. 2002).

Ellingsrud et al., "Remote sensing of hydrocarbon layers by seabed logging (SBL): Results from a cruise offshore Angola," The Leading Edge, pp. 972-982, Oct. 2002.

Evans et al, Upper Crustal Resistivity Structure of the East-Pacific Rise Near 13 degrees North, Geophysical Research Letters, vol. 18, No. 10, pp. 1917-1920, Oct. 1991.

Evans et al., "On the Electrical Nature of the Axial Melt Zone at 13 degrees North on the East Pacific Rise", Journal of Geophysical Research, vol. 99, No. Bl, pp. 577-588, Jan. 1994.

Evans, Constraints on the Large-Scale Porosity and Permeability Structure of Young Oceanic Crust from Velocity and Resistivity Data, Geophysical Journal International, vol. 119, pp. 869-879, 1994.

Explorations, Scripps Institute of Oceanography, vol. 4, No. 2, 1997.

Flosadottir et al., "Marine Controlled-Source Electromagnetic Sounding 1. Modeling and Experimental Design", Journal of Geophysical Research, vol. 101, No. B3, pp. 5507 to 5517, Mar. 10, 1996.

Garg et al., "*Synthetic Electric Sounding Surveys Over Known Oil Fields*", 49 Geophysics 1959-67 (Nov. 1984).

Greer et al., "Remote mapping of hydrocarbon extent using marine Active Source EM Sounding," EAGE 65$^{th}$ Conference & Exhibition—Stavanger, Norway, 4 pages, Jun. 2-5, 2003.

Hordt et al., "A First Attempt at Monitoring Underground Gas Storage by Means of Time-lapse Multi-Channel Transient Electromagnetics", Geophysical Prospecting, vol. 48(3), pp. 489-509, 2000.

Hoversten et al., Maring magnetotellurics for petroleum exploration, Part II: numerical analysis of subsalt resolution. Geophysics 63(3): 826-840 (May-Jun. 1998).

International Search Report—PCT/EP2008/050200 dated Nov. 24, 2008.

International Search Report dated Aug. 24, 2005 PCT/EP2005/051480 and Search Report 0407699.8 dated Sep. 9, 2004.

International Search Report dated Mar. 28, 2003 and International Preliminary Examination Report for PCT/GB02/05355 dated Dec. 9, 2003.

International Search Report dated Dec. 11, 2007 for PCT/2007/003484 and Search Reports for GB 0618238.0 dated Jan. 8, 2007.

International Search Report dated Jul. 28, 2005 for PCT/EP2005/051483 and GB 0407697.2 dated Sep. 14, 2004.

International Search Report for dated Aug. 1, 2005 PCT/EP2005/051484 and Search Report from GB 0407696.4 dated Sep. 9, 2004.

International Search Report for PCT/GB2004/003267 dated Oct. 13, 2004 and Search Report for GB0317649.2 dated Nov. 10, 2004.

International Search Report for PCT/GB2004/050044 dated Jul. 29, 2005 and Search Report GB0400423.0 dated May 21, 2004.

International Search Report for PCT/GB2005/000282 dated Mar. 14, 2006 and GB 0502064.9 dated May 24, 2005.

International Search Report for PCT/GB2005/004626 dated Feb. 3, 2006 and GB 0426505.4 dated Apr. 6, 2005.

International Search Report for PCT/GB2007/003464 dated Apr. 17, 2008 and Search Reports for GB 0618240.6 dated Jan. 22, 2007 and Mar. 22, 2007.

International Search Report PCT/EP2005/052781 dated Aug. 30, 2005 and Search Reports GB0414373.1 dated Oct. 14, 2004.

ISR, dated Mar. 5, 2009 Written Opinion, Preliminary Report on Patentability for PCT/GB2007/002138 and Search Report GB 0611497.9 dated Oct. 17, 2007.

Kaufman et al., "Marine Electromagnetic Prosepecting System", 1981 Annual Meeting. Abstracts. 1 page.

Kaufman et al., "*EM Field of an Electric Dipole on the Surface of a Medium Containing a Thin Resistant Layer*", Frequency and Transient Soundings, publ. Elsevier, (1983).

LITHOS Cambridge advanced lithological imaging project. Aug. 21, 1997.

MacGregor et al. "Use of Marine Controlled Source Electromagnetic Sounding for sub-basalt exploration" EAGE 61st conference and Technical Exihibition,Apr. 2008. Finland. Jun. 1999.

MacGregor et al., "Electromagnetic Evidence for a Crustal Melt Accumulation Beneath the Slow Spreading Reykjanes Ridge", Abstract for 13.sup.th Workshop on EM Induction in the Earth.

MacGregor et al., "*Marine Controlled Source Electromagnetic Sounding: Development of a Regularized Inversion for 2-Dimensional Resistivity Structures*", 1 LITHOS Science Report 103-109 (Apr. 1999).

MacGregor et al., "Marine Controlled Source Electromagnetism: Effect of Source-Receiver Geometry on the Response of 1-D models", 1996.

MacGregor et al., "*The RAMESSES Experiment—III. Controlled-Source Electromagnetic Sounding of the Reykjanes Ridge*", 135 Geophys. J. Int. 773-89 (Jul. 1998).

MacGregor et al., Electrical resistivity structure of the Valu Fa Ridge, Lau Bain, from marine controlled-source electromagnetic sounding, Geophysical Journal International. 146.1 (2001): 217-236.

MacGregor, "Electromagnetic Investigation of the Reykjanes Ridge Near 58° North", PhD Thesis, University of Cambridge.

MacGregor, "Joint analysis of marine active and passive source EM data for sub-salt or sub-basalt imaging," EAGE 65$^{th}$ Conference & Exhibition—Stavanger, Norway, 4 pages, Jun. 2-5, 2003.

(56) References Cited

OTHER PUBLICATIONS

Minkoff et al., "Reservoir characterization via time-lapse prestack seismic inversion," 1998 SEG Expanded Abstracts (4 pgs.).
Mittet, R., et al., "Inversion of SBL data acquired in shallow waters," paper presented at EAGE 66th Conference & Exhibition, 5 pgs., (Jun. 6-10, 2004).
Mittet, Rune, et al., On the orientation and absolute phase of marine CSEM receivers, Geophysics, vol. 72 No. 4 pp. F145-F155 (Jul.-Aug. 2007).
Osen et al., Removal of water-layer multiples from multicomponenet sea-bottom data. Geophysics. vol. 64, No. 3. pp. 838-851. May-Jun. 1999.
Preliminary Examination Report—PCT/GB01/03473 mailed Apr. 24, 2002.
Preliminary Examination Report—PCT/GB99/02823 dated Dec. 5, 2000.
Preliminary Examination Report—PCT/GB00/04667 dated Jan. 29, 2002.
Preliminary Examination Report—PCT/GB99/03039 dated Oct. 10, 2000.
Roston et al., (2003) A Seabed Logging Calibration Survey over the Ormen Lange Gas Field, EAGE, 65th An. Intern. Mtg. Eur.Assoc. Geosc.Eng.Extended Abstracts P058.
Rutledal et al., "Time-Lapse Elastic Inversion at the Oseberg Field," EAGE $64^{th}$ Conference & Exhibition—Florence Italy May 27-30, 2002 (4 pgs.).
Search Report—PCT/GB00/04667 dated Mar. 9, 2001.
Sinha et al., *"Evidence for Accumulated Melt Beneath the Slow-Spreading Mid-Atlantic Ridge,"* 355 Phil. Trans. R. Soc. Lond. A 233-53 (Jan. 1997).
Sinha et al., "An Active Source Electromagnetic Sounding System for Marine Use", Marine Geophysical Researches, 12:59-68, 1990.
Sinha et al., *"Magmatic Processes at Slow Spreading Ridges: Implications of the RAMESSES Experiment at 57 deg. 45'N on the Mid-Atlantic Ridge,"* 135 Geophys. J. Int. 731-45 (Jul. 1998).
Sinha et al., "Sub-Sea-Floor Imaging for Structural and Lithological Properties Using Controlled Source Electromagnetic (CSEM) Sounding", Abstract for Technology for Deep-Sea Geological Investigations, Developments, Applications and Results, Nov. 11-12, 1998.
Sinha., "Controlled Source EM sounding: Survey design considerations for hydrocarbon applications" LITHOS Science Report. Apr. 1999: 95-101.
Slob, "Wave field decomposition of full-polarimetric data based on the two-way wave equation," Grounds Penetrating Radar, Proceedings of the $10^{th}$ Int'l Conference on Delft, The Netherlands, Jun. 21-24, 2004, vol. 1 pp. 315-318 (Jun. 21, 2004).
Strack et al., "Integrating Long-Offset Transient Electromagnetics (LOTEM) with Seismics in an Exploration Environment", Geophysical Prospecting, vol. 44, pp. 997-1017, 1996.
Unsworth et al., "Electromagnetic Induction by a Finite Electric Dipole Source Over a 2-D Earth", Geophysics, vol. 58, pp. 198-214, 1993.
Unsworth, "Electromagnetic Exploration of the Oceanic Crust with Controlled-Sources", Chptr 5, Insight into Induction, PhD Thesis, University of Cambridge, 1991.
Ursin, "Review of elastic and electomagnetic wave propagation in horizontally layered media" Geophysics. vol. 48, No. 8. pp. 1063-1081. Aug. 1983.
Varela et al., "Assessing dynamic reservoir behavior with time-lapse pre-stack 3D seismic data: a sensitivity study based on inversion," EAGE $64^{th}$ Conference & Exhibition—Florence Italy May 27-30, 2002 (4 pgs.).
Young et al., "Electomagnetic Active Source Sounding Near the East Pacific Rise" Geophysical Research Letters. vol. 8, No. 10. pp. 1043-1046. Oct. 1981.
Yuan et al., "Electromagnetic Assessment of Offshore Methane Hydrate Deposits on the Cascadia Margin, GP22A-08", American Geophysical Union Fall Meeting, San Francisco, 1998.
Yuan et al., *"The Assessment of Marine Gas Hydrates Through Electrical Remote Sounding: Hydrate Without a BSR?"*, 27 Geophys. Res. Letts. 204-217 (Aug. 15, 2000).
Application and File History of U.S. Patent No. 6,628,119, issued Sep. 30, 2003, inventor Eidesmo.
Application and File History of U.S. Patent No. 7,026,819, issued Apr. 11, 2006, inventor Eidesmo.
Application and File History of U.S. Appl. No. 11/287,893, filed Nov. 28, 2005, inventor Eidesmo.
Application and File History of U.S. Patent No. 6,696,839, issued Feb. 24, 2004, inventor Ellingsrud.
Application and File History of U.S. Patent No. 6,864,684, issued Mar. 8, 2005, inventor Ellingsrud.
Application and File History of U.S. Appl. No. 11/585,992, filed Oct. 24, 2006, inventor Ellingsrud.
Application and File History of U.S. Appl. No. 11/585,991, filed Oct. 24, 2006, inventor Ellingsrud.
Application and File History of U.S. Patent No. 6,717,411, issued Apr. 6, 2004, inventor Ellingsrud.
Application and File Histroy of U.S. Patent No. 6,900,639, issued May 31, 2005, inventor Ellingsrud.
Application and File History of U.S. Patent No. 7,038,456, issued May 2, 2006 inventor Ellingsrud.
Application and File History of U.S. Patent No. 7,202,669, issued Apr. 10, 2007, inventor Ellingsrud.
Application and File History of U.S. Patent No. 7,423,432, issued Sep. 9, 2008, inventor Amundsen.
Application and File Histroy of U.S. Patent No. 7,319,330, issued Jan. 15, 2008, inventor Ellingsrud.
Application and File History of U.S. Publication No. 2006/0202697, published Sep. 14, 2006, inventor Sodal.
Application and File History of U.S. Publication No. 2008/0122444, published May 29, 2008, inventor Schaug-Pettersen.
Application and File History of U.S. Publication No. 2009/0134877, published May 28, 2009, inventor Schaug-Pettersen.
Application and File History of U.S. Patent No. 7,126,338, issued Oct. 24, 2006, inventor Eidesmo.
Application and File History of U.S. Publication No. 2007/0150201, published Jun. 28, 2007, inventor Eidesmo.
Application and File History of U.S. Patent No. 6,859,038, issued Feb. 22, 2005, inventor Ellingsrud.
Application and File History of U.S. Patent No. 7,145,341, issued Dec. 5, 2006, inventor Ellingsrud.
Application and File History of U.S. Patent No. 7,149,672, issued Dec. 12, 2006, inventor Torkildsen.
Application and File History of U.S. Publication No. 2008/0195358, published Aug. 14, 2008, inventor El Ouair.
Application and File Wrapper of U.S. Patent No. 7,613,570, issued Nov. 3, 2009, inventor Rosten.
Application and File Wrapper of U.S. Patent No. 7,664,603, issued Feb. 16, 2010, inventor Rosten.
Application and File History of U.S. Pubication No. 2008/0065330, published Mar. 13, 2008. inventor Rosten.
Application and File History of U.S. Publication No. 2008/0221795. Sep. 11, 2008, inventor Amundsen.
Application and File History of U.S. Publication No. 2010/0057363, published Mar. 4, 2010 inventor Amundsen.
Application and File History of U.S. Appl. No. 12/441,632, filed Sep. 24, 2009, inventor Mittet.
Application and File History of U.S. Publication No. 2010/0045295, published Feb. 25, 2010, inventor Mittet.
Application and File History of U.S. Appl. No. 12/443,189, filed Dec. 30, 2009, inventor Ridyard.
U.S. Appl. No. 61/298,582, filed Jan. 27, 2010 inventor Perryman.
Application and File History of U.S. Patent No. 6,834,732, issued Dec. 28, 2004, inventor Haarstad.
Application and File History of U.S. Publication No. 2010/0052688, published Mar. 4, 2010, inventors Schaug-Pettersen.
Application and File History of U.S. Appl. No. 12/304,073, filed Mar. 10, 2009, inventor Ellingsrud.
Application and File History for U.S. Appl. No. 13/015,138, filed Jan. 27, 2011, inventor Perryman et al.

(56) References Cited

OTHER PUBLICATIONS

Peyronnet, Jean-Paul, et al., "POSIDONIA 6000: A New Long Range Highly Accurate Ultra Short Base Line Positioning System," *Oceans '98 Conference Proceedings, Nice, France, IEEE,* vol. 3, pp. 1721-1727 (Sep. 1998).

Opderbecker, Jan, "At-Sea Calibration of a USBL Underwater Vehicle Positioning System," *Oceans ' 97 Conference Proceedings Halifax, NS, Canada, MTS/IEEE,* vol. 1, pp. 721-726 (Oct. 1997).

Bermejo, Geophysical Discovery of a New LNAPL Plume at the Former Wurtsmith AFB, Oscoda, Michigan, Fall 1997 GWMR. pp. 131-137.

About GSSI—Ground Penetrating Radar Equipment Manufacturer, printed Jan. 10, 2012. 2 pages.

Ground Penetrating Radar and Geophysical Services, printed Jan. 10, 2012. 5 pages.

Model 4108 Horn Antenna System Settings and User Notes. Feb. 2002. 7 pages.

About GSSI—Ground Penetrating Radar Equipment Manufacturer, 2 pages. printed Jan. 10, 2012. 2 pages.

Model 4108 Horn Antenna System Settings and User Notes. 7 pages. Feb. 2002. 7 pages.

Cheesman et al., "On the theory of sea-floor conductivity mapping using transient electromagnetic systems", Geophysical, vol. 52. No. 2. Feb. 1987 pp. 204-217.

Greaves et al., New Dimensions of Geophysics for Reservoir Monitoring, pp. 141-150. Jun. 1991.

Nekut et al., "Petroleum Exploration Using Controlled Source Electromagnetic, Methods", Proceedings of the IEEE, vol. 77(2), pp. 338-362, Feb. 1989.

Spies, "Recent Developments in the use of Surface Electrical Methods for Oil and Gas Exploration in the Soviet Union", Geophysics, vol. 48(8), pp. 1102-1112, Aug. 1983. Abstract Only.

\* cited by examiner

POSITIONING SYSTEM

PRIORITY CLAIM

The present application is a National Phase entry of PCT Application No. PCT/GB2007/003880, filed Oct. 11, 2007, which claims priority from Great Britain Application Number 0620328.5, filed Oct. 12, 2006, the disclosures of which are hereby incorporated by reference herein in their entirety.

TECHNICAL FIELD

The present invention is directed towards a positioning system for use in electromagnetic surveying or Seabed Logging surveys and in particular for use in 3 dimensional surveys.

BACKGROUND

Seabed Logging methods can be used to directly detect hydrocarbon reservoirs beneath the sea floor. These methods comprise deploying an electromagnetic source near the sea floor and measuring the response using one or more receiver instruments located at intervals spaced across the sea floor. The receiver instruments may be in the form of long rigid arms carrying electrical sensors, extending from a central body, which facilitate the detection of low-level electrical signals in seawater. The sensors at the end of the arms are therefore placed near or at the sea floor.

According to one existing method, instruments are deployed as follows: the positively buoyant instrument and an attached concrete anchor are dropped from a survey vessel at a chosen location; the instrument sinks freely to the sea floor; the position of the instrument while sinking may be monitored by acoustic methods using one or more transponders; the instrument is positioned near to or on the sea floor in a desired location which is held steady by means of the concrete anchor. The instrument is then used to measure and store data during a survey while it is located on or near to the sea floor. After the measurements are complete, acoustic commands from the sea surface cause the instrument to be released from the anchor; the instrument then floats up to the sea surface for retrieval by a survey vessel and the data is extracted from the instrument.

More specifically, a number of different systems may be combined in use to position a Seabed Logging source and one or more receivers prior to conducting a survey. These include, but are not limited to, acoustic transponders (mainly used for receiver positioning), magnetic compass systems (mainly used for orientation in the horizontal plane), depth transducers and altimeters (mainly used for orientation in the vertical plane), tilt and pitch sensors (for spatial orientation of the receivers), and gyro systems (for spatial and horizontal orientation). However, each of these has advantages and disadvantages when seeking the accuracy of data required to process and interpret the detected data to provide a 3D map. Examples of problems typically include acoustic ambient noise, sound reflections, ray bending and the varying sound transmission properties in salt water mainly caused by the variations in properties such as salinity and sea water temperature versus depth. This can wrongly image a target, or transponder, to be observed with a false offset both in range and in direction. At extreme angles, the target or transponder may even not be detected as it falls within a shadow zone caused by this ray bending. The magnetic direction may also locally vary from area to area and this deviation may additionally change some degrees in magnetic storm conditions and can be complicated to detect and compensate for. The resulting measurements can therefore include errors which are too large for use in 3D solutions.

An example of a problem is that known acoustic or electrical replying systems for positioning introduce external noise on the measured signals if the source is located in the near proximity of the highly sensitive Seabed Logging sensors. Such noise may introduce errors in the positioning and relative orientation measurements which may not be entirely removed during subsequent processing of the measured data. These errors may be amplified in a 3D analysis.

Higher degrees of accuracy in sensor positioning are required for new acquisition techniques, for example, 3D acquisition, as well as being desirable for improving the accuracy of results obtained from other processing techniques. Electric and magnetic fields are 3D vector dimensional and hence it is necessary to understand and include a full understanding of the spatial orientation of the sensors. There is therefore a need to improve the performance of receiver instruments, in order to improve the accuracy and efficiency with which surveys may be carried out and the acquisition of data may be undertaken.

SUMMARY OF THE INVENTION

Embodiments of the invention provide a positioning system which results in the position and orientation of the source and receivers being known to a degree of accuracy such that the contribution to the uncertainty in the measured EM field is less than 5% from all sources of error. This includes circumstantial requirements (positional and relative timing) as well as non-circumstantial requirements such as orientation of the sensors.

In one embodiment, a passive listening acoustic system comprises source means for providing continuous, pulsed or pulse coded acoustic signals at two or more different frequencies; and at least two acoustic sensors or hydrophones, said acoustic sensors or hydrophones comprising means for detecting said acoustic signal and means for recording the detected signal.

In one embodiment, the system may be used to measure the position of a Seabed Logging receiver, which is located at the sea floor. The receiver may comprise flexible arms extending in the same plane at approximately 90° to each other. At the end of each arm is an electric field sensor. Associated with each of these sensors is an acoustic sensor or hydrophone which is located close to the electric field sensor. Since the exact position of each hydrophone relative to each electric field sensor is known, measurements from the hydrophones can be converted into measurements for the real position and orientation of each electric field sensor. Accurate relative positions of the electric field sensors on each receiver to each other can therefore also be obtained.

The receiver may be deployed on a rigid frame which may have at least two hydrophones secured to it such that the exact position and orientation of the frame can also be measured. The receiver frame may also further include magnetic sensors. The hydrophones are preferably positioned on opposite sides of the frame to maximize their separation. The calculated position solution from these measurements can supplement the readout from any other approved depth, tilt and pitch sensors designs which may also be fixed to the frame. Any difference between the calculated position solution and the supplement solution may thereafter either confirm or correct the other corresponding hydrophone readings on the receiver.

The acoustic signal which is transmitted has a low transducer current draw relative to the sensing threshold at the detecting distance and accordingly low-level measurement signals which will not interfere with highly sensitive Seabed Logging sensors. The EM sensors are not sensitive to such a dedicated transmitted acoustic signal provided that the distance between the sound source and receiver is sufficiently large and the sensors and/or connecting wires do not detect adequate movement due the acoustic shock wave. The magnetic EM sensors would typically not be able to detect the increased current draw from a selected acoustic transmitter at ranges closer than about 10 meters. The EM sensors could possibly be saturated at very close ranges but would hardly be damaged by the radiated acoustic- or electric field alone. The source may be towed at any suitable distance from the sea floor, for example in the range of 5-100 m, or 10-70 m, or 15-50 m, for example 15-40 m or 20-30 m. In other embodiments the source may be towed closer to the water surface.

The receivers and/or the frame on which they are mounted may additionally include one or more acoustic transponders. The transponders may be used to track the position of the receiver during deployment or during recovery and be an acoustic link for data and/or command transfer between receivers and surface equipment. They may also be used to activate and/or drive the release of the receiver from the sea bottom during the recovery process.

The receivers and/or frames may additionally include one or more of depth, tilt and pitch sensors to enable further data to be collected and incorporated into the map generated.

The invention also comprises a method of accurately determining the position of a towed electromagnetic source and one or more electromagnetic receivers for use in a Seabed Logging survey; the receivers including at least one acoustic sensor or hydrophone closely associated with each electromagnetic sensor, the method comprising dropping each receiver into the sea water and allowing it to sink to the seafloor; activating a first acoustic source at a first frequency and measuring the position, time, and movement of the first acoustic source, activating a second acoustic source at a second frequency and measuring the position time and movement of the second acoustic source, simultaneously recording the detected acoustic signals on each hydrophone at both the first and second frequencies, and passing the measured data to a central computer to calculate the phase difference and/or travel time between pairs of hydrophones.

The system may further include a rigid frame for each receiver and the frame may include one or more additional components selected from: orientation sensors, depth, tilt and pitch sensors, magnetic sensors and hydrophones.

The system may include one acoustic sensor or hydrophone for each electric field sensor, the hydrophone being located close to each electric field sensor. This arrangement can take into account variations in the angle between sensors which may be caused by underwater currents or dislodging of the sensors as the receiver was deployed.

In one embodiment, the method utilises several phase measurements for each seabed receiver to increase the accuracy of the positioning. The solution from this network of phase measurements taken from multiple receivers will improve the accuracy. The number of measurements increases the accuracy through statistic methods and the use of mean square analysis. The method may use a strong omni directional acoustic source detectable at a long distance between source and receivers. The usable range for the acoustic source signal may vary dependent of the survey layout and sea- and bathymetric properties. A normal usable acoustic range for the orientation issues will typically be between 100 meters at closest and ranging out to typically 1000 meters farthest off.

The data recorded at each receiver is downloaded onboard the survey vessel after completion of the survey. The time stamps and phase measurements of each pair of hydrophones are stored as part of the Seabed Logging data recorded in the receivers. The relative positions and orientations are then subsequently calculated by a dedicated and proprietary navigation software package.

BRIEF DESCRIPTION OF THE DRAWINGS

Embodiments of the invention will now be described, by way of example only, with reference to the accompanying drawings, in which.

Figure 1:
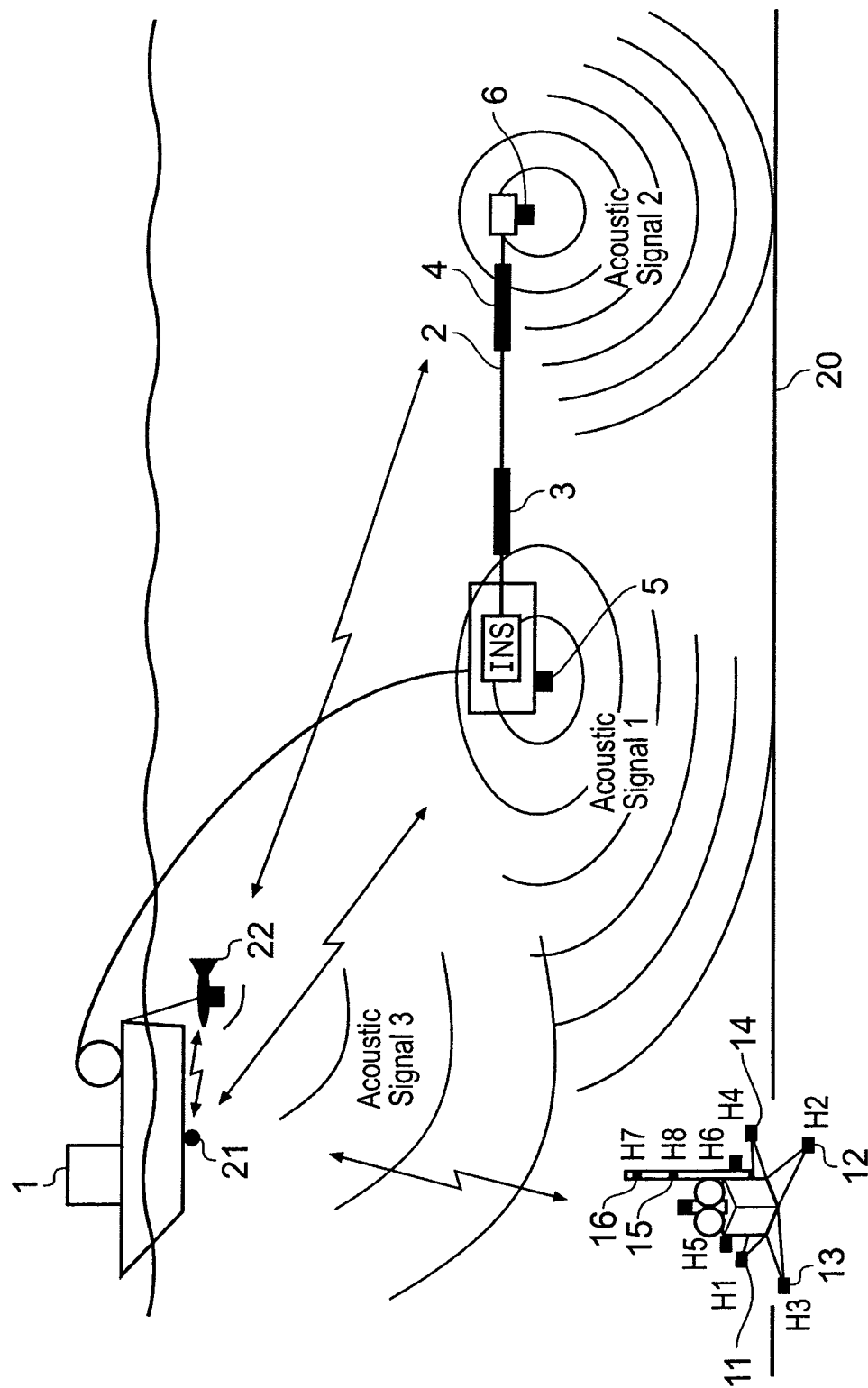
FIG. 1 is a schematic depiction of a basic set up for determining the positioning of a receiver according to an embodiment of the present invention.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE DRAWINGS

Referring to FIG. 1, there is shown a basic representation of the relative positions of a vessel 1 and towing streamer 2 which includes two high current electrodes 3, 4. The streamer also includes two acoustic sources 5, 6 which emit acoustic signals at different frequencies and/or pulse shapes, here named acoustic signal 1 and acoustic signal 2. The vessel could alternatively tow more than one streamer with the electrodes or acoustic sources on them (not shown). A receiver 10 is positioned on a frame and has been dropped to the sea floor 20. The receiver has in principle four electric field sensors 11, 12, 13, 14 arranged substantially orthogonally in substantially the same plane. The receiver may also have in principle other pairs of electric field sensors 15, 16 arranged substantially in the vertical plane. Each sensor 11, 12, 13, 14, 15, 16 has a hydrophone H1, H2, H3, H4, H7, H8 respectively associated with it. The frame may also have numbers of pairs of hydrophones H5, H6 arranged on opposite sides of the frame (see FIG. 3). Other types of sensors may be located inside the frame related to the orientation of the frame. These are typically magnetic field sensors and depth sensors and tilt and pitch sensors and are shown as 17, 18, 19 in FIG. 3.

By knowing the towing constant speed and the approximate position of the moving vessel and the approximate position of the acoustic source at any particular time, and the relative angles between the source and receivers, the average source and receiver positions and orientations can be calculated by network solution techniques. Similar techniques have been used, for example, for positioning seismic vertical/ bottom streamers and for localization of a target relative to arrays of receivers on land or subsea. In the present invention, this technique is used to measure the orientation and position of stationary objects while using a moving rather than stationary source. This will give results in both the horizontal plane and in the 3-D volume.

The vessel may have an Ultra Short Base Line (USBL) transponder 21 fitted to the bottom of the vessel to measure the position of the electromagnetic streamer, both the front end and the tail. The vessel may additionally have a further transmitter 22 with acoustic signal 3 which may be used to measure the position of vessel 1 relative to the receiver 10. This additional transmitter may be either hull mounted (not shown) or towed separately from the electromagnetic streamer as shown in FIG. 1. In this case the towed transmitter may be positioned relative to the vessel by the USBL transponder 21.

The source may typically be towed about 30 meters above the sea bottom. Either one or both of the acoustic sources may be located on the same streamer antenna as the electromagnetic source. Both acoustic sources could be located on the electromagnetic source streamer towed behind the vessel, one at the front tow fish, and the other at the rear or tail end of the towed antenna streamer. Alternatively, one or two of the acoustic sources may be on the one streamer and one or two may be on a separate source towed on a separate streamer. Each acoustic source is recognized with individual unique source signature.

By contrast, the hydrophones are located close to the E-field sensors, i.e. positioned onto the sea bottom. Different sound transmission properties determine the usable range between source and receiver. Examples include:

Bathymetry
Sound reflections and refractions
Source strength and attenuation
Ray bending due to local variations in salinity and temperature, i.e. thermoclines etc.
Receiver signal to noise properties.

Figure 2:
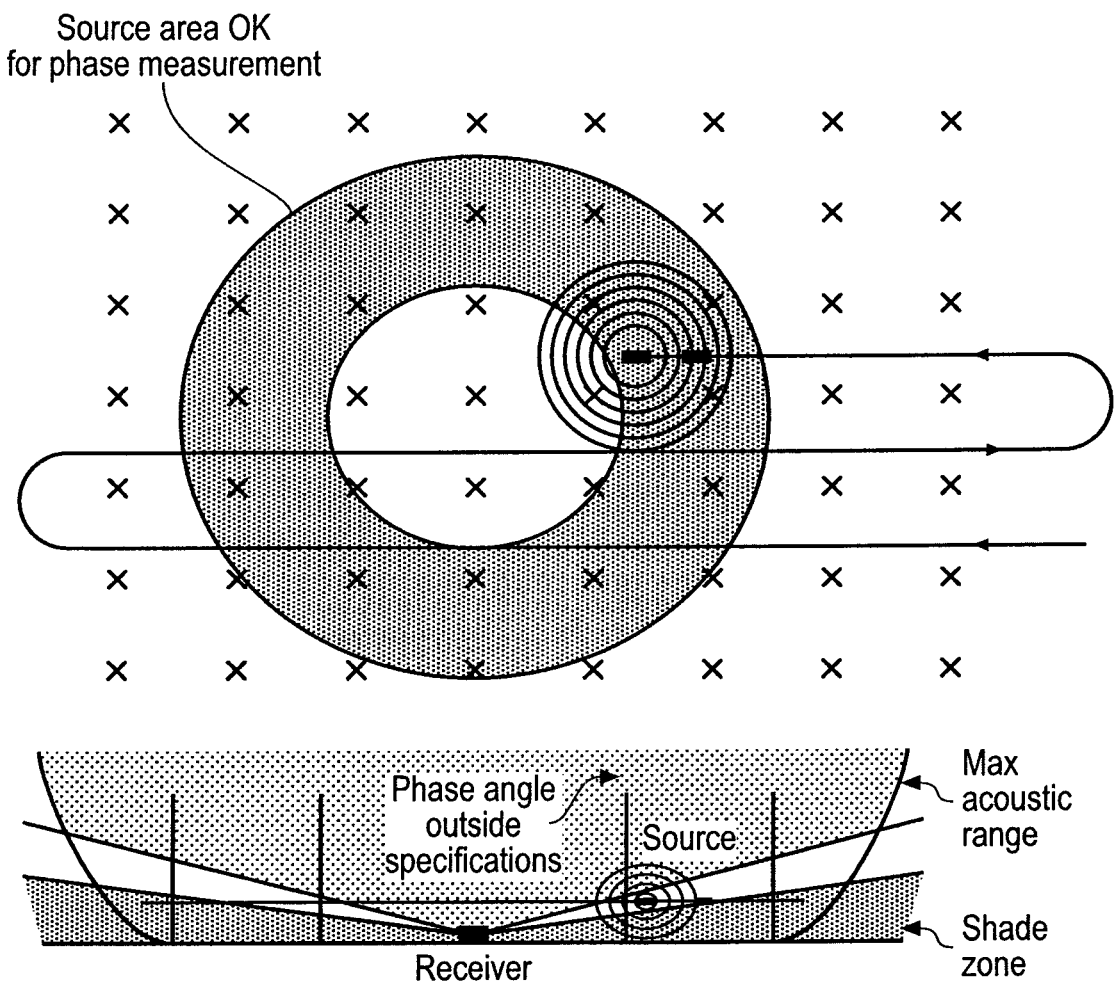
FIG. 2 is a diagram showing an area around each receiver where measurements can be taken according to an embodiment of the present invention.

FIG. 2 shows in a schematic manner how some of the different limiting factors interact to produce an area where the acoustic source signal may be received. Bathymetry and the sound cancellation effects due to reflection will introduce a shaded zone along the sea bottom with a survey-area dependant slope angle. This usable maximum distance is assumed to range out to approximately 1000 meters if there is a "clear" line of sight between the source and receivers elements. If the seafloor bathymetry is rugged or undulating, the range may be reduced accordingly. The source strength, frequency and signal to noise ratio are also contributing factors that determine the maximum detectable range between source and receiver. But, the effects of these factors can be minimized by a critical selection of the hardware products.

Another limiting range factor is the angle between source and the pairs of hydrophones. If the horizontal angle is higher than above a given limit (i.e. the source is close to the receiver), the errors in the phase angles for orientation measurements related to the horizontal plane are considerable. A minimum distance for horizontal phase measurements would typically be approximately 100 m for an acoustic source towed at typically 30 m above the sea bottom. The closest distance related to this error will also be counted for in the spatial position calculations and therefore most likely be reduced to a minimum. In fact, for a 90° horizontal angle, i.e. zero phase difference between at least one pair of hydrophones, the position solution is within a surface plane perpendicular to the line between the two hydrophones. This zero phase information can be utilized for a better position estimate at close vicinity. Overall this leads to a given survey dependant dough ring area (the shaded area in FIG. 2) around each receiver where the source can be located while using the phase measurements to determine the exact position and orientation of the receiver.

As described above, FIG. 2 shows the area around each receiver within which measurements can optimally be taken. The precise formation of the area will vary from survey to survey as it is affected by variables such as source, strength, and attenuation, local variations in salinity and temperature, sound reflections, etc. However, many of these variables will be known and the preferred area can be selected by navigation processing software given the actual towing source altitude such that data as recorded at each hydrophone, accurately determines the position of each receiver and each sensor on each receiver.

Figure 3:
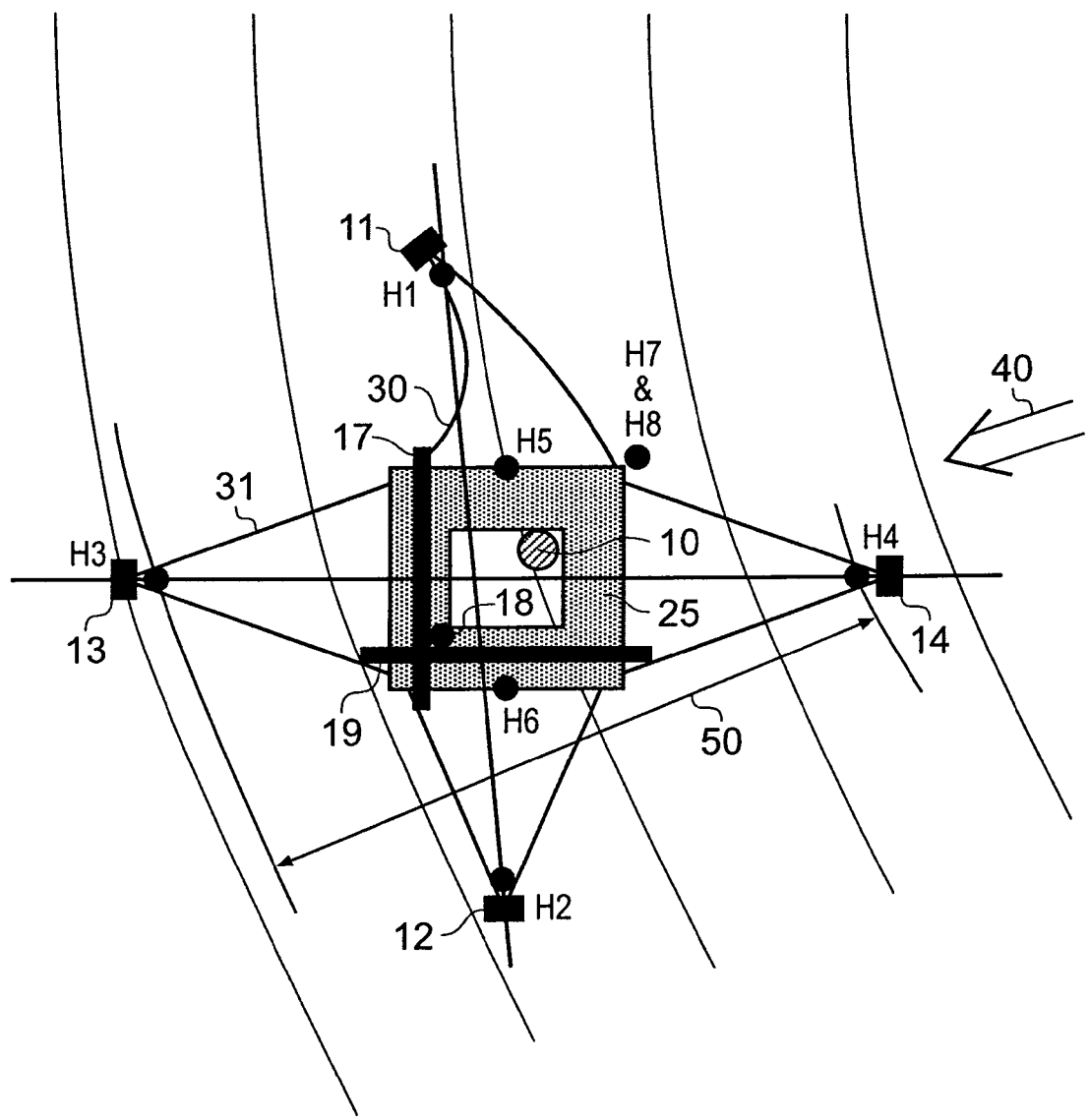
FIG. 3 is a diagram showing a receiver on a frame with pairs of hydrophones, pairs of electrical field sensors, triples or pairs of magnetic sensors and an acoustic (sound) wave propagating past a receiver according to an embodiment of the present invention.

FIG. 3 shows a top view of receiver 10 mounted on a frame 25. The receiver comprises flexible arms 30, 31 on which are mounted electric field sensors. The arms are arranged to extend substantially orthogonally to each other within the same plane. However, this cannot be assured after the receiver has dropped to the sea floor and angles may therefore vary slightly as shown in FIG. 3. Therefore, there are hydrophones H1, H2, H3, H4 associated with each sensor 11, 12, 13, 14 to measure the acoustic signals received at a position adjacent to the sensor.

The frame 25 also has hydrophones H5, H6 mounted at opposite sides. This is to measure the orientation of the receiver once it has settled on the sea floor. For theoretical modeling, it is normally assumed that the sea floor is substantially flat and that the receivers will therefore lie such that the sensors are all in the same horizontal plane. In practice this will not be the case and hydrophones H5 and H6 determine the horizontal orientation of the frame and hence also of the sensors that are located/fixed onto the frame. Hydrophones H7 and H8 may additionally be mounted vertically relative each other on the frame or onto a vertical pole attached to the frame to determine the spatial orientation. One example of vertical mounting H7 and H8 is shown in FIG. 1. FIG. 3 also shows the acoustic or sound waves being propagated in the direction of arrow 40 and the phase difference between two hydrophones H3 and H4 by means of arrow 50.

Figure 4:
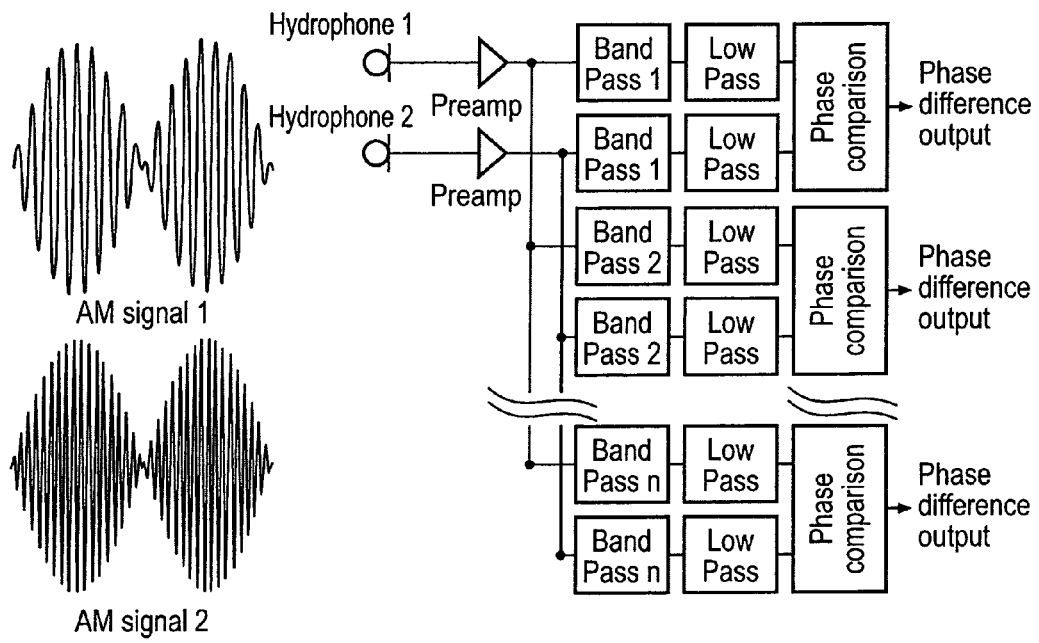
FIG. 4 is a diagram that schematically shows different signals measured by hydrophones in a first embodiment of phase measurement and calculation according to an embodiment of the present invention.

Described below are two embodiments for the method of analyzing and using the data to measure the phase between pairs of hydrophone signals. FIG. 4 shows schematically the different signals received by a pair of hydrophones according to a first embodiment of the present invention.

According to the first embodiment, each of the two or alternatively three acoustic source signals is a continuous amplitude modulated mono frequency, also known as an AM-signal. Referring to acoustic signal 1, signal 2 and signal 3 in FIG. 1, an AM signal is designed by two frequencies, i.e. the modulated frequency with the information of interest and a carrier frequency usable for the transmitting medium. The selection of the carrier frequencies are given by the propagation of sound in sea water and the best selection of corresponding transceivers and receivers for the actual water depths and typically frequencies ranging between 12 kHz to 50 kHz. The selection of frequencies shall not interfere with the other survey subsea communications, such as for example USBL positioning commands, altimeters and echo sounders. The maximum wavelength of the modulated frequencies in the present invention is defined as the half wavelength which equals the distance between named pairs of hydrophones. For example, for 8 meter sensor arm length and using the sound of speed in water as 1500 m/s, the maximum modulated frequency is about 100 Hz. The true speed of sound close to the sea bottom can be measured and counted for in the calculations.

The acoustic sources and pairs of hydrophone receivers can be associated with the following AM-radio transmitter/receiver similarity. Each of the acoustic sources is a broadcast AM transmitter tuned for sending 100 Hz humming signals. Each of the hydrophones is an AM radio antenna. A pair of hydrophones can make a receiver a directional dipole antenna. All the electronics after the hydrophones are individual radio receivers tuned to listen for individual programs and hence able to filter out all other AM-modulated broadcasted signals.

The hydrophones measure all the individual frequency carrier signals as they continuously arrive at the hydrophones. The signals are then conditioned by individual charge amplifiers and further sent to the individual bandpass filters. The filters are designed so that only one carrier frequency can pass through each bandpass filter. The bandpass filtered signal is then sent through low-pass filters so that only the low frequency of about 100 Hz is passing through. By this method each comparing phase circuitry will only detect the signal from only one of the designated acoustic source transmitters. Each of the pairs of two hydrophone signals can be subsequently compared in an off the shelf electronic circuitry where the phase difference is output as an analog signal scaled as V/degree. These analog output signals can either be measured directly onto analog input channels on the subsea data logger on the Seabed Logger receivers or preferably be digitized onto a separate electronic circuitry and the phase difference results be finally exported in selected real time intervals to the datalogger as digital values and stored as a part of the recorded time-stamped Seabed Logging data.

Figure 5:
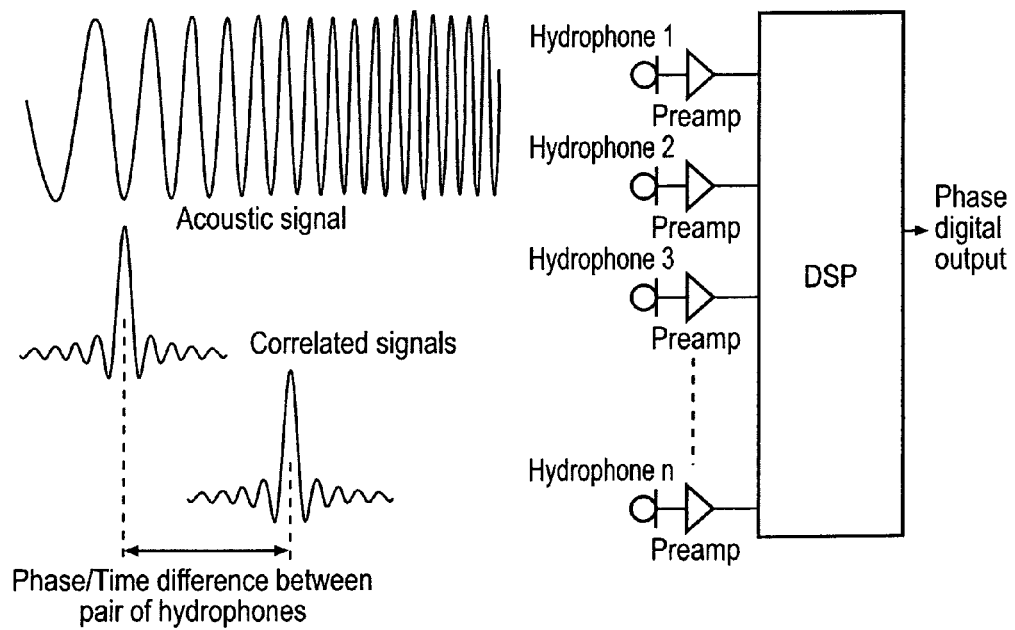
FIG. 5 is a diagram that schematically shows different signals measured by the hydrophones in a second embodiment of phase measurement and calculation according to an embodiment of the present invention.

FIG. 5 shows schematically a second embodiment of the invention for measuring the phase between a pair of hydrophones. In this embodiment, the different source signals may consist of any type of signal as long as they differ from each other and the signal can be detected over the required range and preferably knowing their original transmitted signal shape and the duration is known. The figure shows one example of two applicable signals that is constructed of one up-sweep and the other of one down sweep, also called "chirp-signals", with sufficient duty cycle each from an individual source—acoustic sources 5, 6 in FIG. 1. The signal will in this application typically sweep though all frequencies ranging between 15-25 kHz over a time period of 5 seconds. The signal can also be composed of single pulses or other different coded type signals like "spread spectrum" or "phase shifted code" known from wideband transmission technologies.

The selection of the transmitted frequencies are again given by the propagation of sound in sea water and the best selection of corresponding transceivers and receivers for the actual water depths and typically frequencies ranging between 12 kHz to 50 kHz. The qualified selection of coded signal ranging over a variety of frequencies will under normal conditions not interfere with the other survey subsea communications, such as, for example, USBL positioning commands, altimeters and echo sounders. After measuring the signals at the hydrophones, the signals are again conditioned by individual charge amplifiers and detected by a "digital signal processor" (DSP) with ready integrated analog- to digital converters. The DSP is programmed to calculate the cross-correlation between the different hydrophone signals. The time difference between the two maximum outputs from the cross-correlation is a direct measure of the relative arrival times or the direct phase difference by knowing the velocity of sound traveling between the hydrophones. The results are exported in selected real time intervals to the data logger as digital values and stored as a part of the recorded time-stamped Seabed Logging data This DSP method has the advantage that all combinations between phase differences and/or relative arrival times between multiple numbers of pairs of hydrophones can be calculated inside one chip. This makes subsequent electronics smaller, with less power consumption and making the processing to form the 3-D volume of the area being surveyed easier.

The invention provides embodiments of an apparatus and a method for accurately determining the relative positions of a vessel, electromagnetic source and receivers in the same time frame and thereby enabling the determination of a 3-D volume of the area being surveyed to be drawn up after the results of the EM survey have been analysed. Embodiments of the apparatus and method of the invention do not damage the sensitive sensor equipment used in Seabed Logging surveys and also allows the position of the receiver to be measured at the same time as the electromagnetic signals are being transmitted and received by the sensors—i.e., in a single pass.

For an accurate 3-D volume to be determined, it is necessary to have accurate positioning of both source and receiver. Embodiments of the invention determine the relative positions and geometry of the vessel, electromagnetic source and receivers in the same time frame. The relative positions are tied to the true position world coordinates by surface vessel positioning such as by "Global Positioning System". GPS satellites are commonly used references today. A selection of two or more sea bottom receivers can additionally be positioned more accurately by other standard surveying methods as for example triangulation and vessel spin on top of each selected receiver to cancel out misalignment and USBL positioning errors. This is normally a time consuming process and inappropriate if many receivers deployed on a survey area. But, knowing the more exact position of a few receivers will help improving to tie the relative network positions to the true position world coordinates.

For a Seabed Logging source, the uncertainty of the source orientation angles should be less than 2 degrees. For example, if the antenna length is 300 meters, this means that the relative positions of head and tail of the antenna should be known within 15 meters. The uncertainty of the timing should be less than 4 ms in order to produce correct phase. In order to produce correct amplitudes the drift in timing is required to be less than 1 ms.

The uncertainty of the source position parallel to the seafloor should be less than 13 meters. The uncertainty in source depth should be less than 7.5 meters. The uncertainty of the source elevation should be less than 7.5 meters and the uncertainty of the source length should be less than 5 percent. The uncertainty of the source current should be less than 5 percent and finally the relative standard deviation of the source should be less than 0.02.

There are similarly high requirements for each of the Seabed Logging receivers. The uncertainty of orientation angles of the receivers should be less than 2 degrees. The uncertainty of the timing should again be less than 4 ms in order to produce correct phase. In order to produce correct amplitudes versus offsets, the drift in timing is required to be less than 1 ms. The uncertainty of the receiver position should be less than 13 meters in horizontal direction and less than 7.5 meters in depth. The uncertainty of the electrode distances should be less than 5 percent (40 cm with 8 meters nominal electrode separation).

By determining the positions of the electromagnetic source and receivers to such accuracy it is possible to determine the 3-D volume for the area being surveyed. In particular, the apparatus and method of the invention provide measurements which meet the requirement that the contribution to uncertainty in the measured electromagnetic field should be less than five percent from all sources of error.

The invention claimed is:

1. A Seabed Logging system comprising:
    an electromagnetic source towed by or coupled to a seagoing vessel;
    at least one electromagnetic receiver located remotely from the electromagnetic source on a structure located at least temporarily on the seabed wherein each of the at least one electromagnetic receiver includes one or more electromagnetic sensors; and
    a passive listening acoustic positioning system, the passive listening acoustic positioning system comprising:
        an acoustic source transmitting at least two characteristic continuous, pulsed, or pulse coded acoustic signals at two or more different frequencies; and
        passive listening acoustic sensors or hydrophones also on the structure located at least temporarily on the seabed at a fixed location, at least two of the passive listening acoustic sensors or hydrophones being located close to each electromagnetic sensor and remotely from the acoustic source.

2. The system of claim 1, wherein the electromagnetic receiver is carried on a rigid frame of the structure located at least temporarily on the seabed, the at least two acoustic sensors or hydrophones being secured to said frame.

3. The system of claim 2, wherein the at least two acoustic sensors or hydrophones are positioned on opposite sides of the frame.

4. The system of claim 1, further comprising at least one transponder disposed close to the electromagnetic source or the electromagnetic receiver.

5. The system of claim 1, further comprising a sensor for measuring depth, tilt, or pitch.

6. The system of claim 1, wherein the electromagnetic receiver includes a magnetic sensor.

7. The system of claim 1, wherein phase measurements are recorded and stored as time-stamped data, in the system.

8. The system of claim 1, wherein phase measurements are processed on the surface to calculate positions and attitudes after survey data has been collected and downloaded.

9. The system of claim 1, wherein the at least two characteristic continuous, pulsed, or pulse coded acoustic signals are up-or down-sweep signals (Chirp signals) or spread spectrum signals or phase shifted code signals.

* * * * *